United States Patent
Maaref et al.

(10) Patent No.: US 10,080,120 B2
(45) Date of Patent: Sep. 18, 2018

(54) SYSTEM AND METHOD FOR MACHINE TYPE COMMUNICATION

(71) Applicants: Amine Maaref, Kanata (CA); Jianglei Ma, Ottawa (CA)

(72) Inventors: Amine Maaref, Kanata (CA); Jianglei Ma, Ottawa (CA)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 124 days.

(21) Appl. No.: 14/570,445

(22) Filed: Dec. 15, 2014

(65) Prior Publication Data

US 2016/0174205 A1    Jun. 16, 2016

(51) Int. Cl.
    *H04W 4/00*     (2018.01)
    *H04W 72/04*     (2009.01)
    *H04W 4/70*     (2018.01)
    *H04W 88/06*     (2009.01)

(52) U.S. Cl.
    CPC ........... *H04W 4/70* (2018.02); *H04W 72/048* (2013.01); *H04W 88/06* (2013.01)

(58) Field of Classification Search
    CPC .. H04W 4/005; H04W 4/006; H04W 72/0413
    See application file for complete search history.

(56) References Cited

U.S. PATENT DOCUMENTS

| | | | |
|---|---|---|---|
| 9,433,016 B2 * | 8/2016 | Yang | H04W 74/0816 |
| 2009/0109912 A1 | 4/2009 | DiGirolamo et al. | |
| 2012/0113887 A1 * | 5/2012 | Shen | H04W 36/0033 |
| | | | 370/315 |
| 2012/0250578 A1 * | 10/2012 | Pani | H04W 48/12 |
| | | | 370/254 |

(Continued)

FOREIGN PATENT DOCUMENTS

| | | |
|---|---|---|
| CN | 102130839 A | 7/2011 |
| JP | 2014155161 A | 8/2014 |

(Continued)

OTHER PUBLICATIONS

Farhadi, G., et al., "Group-Based Signaling and Access Control for Cellular Machine-to-Machine Communication", Vehicular Technology Conference (VTC Fall), 2013 IEEE 78th, Sep. 2-5, 2013, pp. 1-6.

(Continued)

*Primary Examiner* — Xavier Szewai Wong

(57) ABSTRACT

A method at a network element for providing data access to a network. The method comprising establishing a primary communication channel with the network with a first wireless interface of said network element, establishing a complementary communication channel with one or more of a group of delay tolerant devices with a second wireless interface of said network element, receiving data from respective delay tolerant devices in the group, aggregating the received data and transferring said aggregated data on the established primary communication channel to the network. In an embodiment the primary and complementary channels correspond respectively to first and second spectrums, which may in turn be, respective, licensed and unlicensed spectrums.

35 Claims, 7 Drawing Sheets

(56) References Cited

U.S. PATENT DOCUMENTS

| | | | |
|---|---|---|---|
| 2013/0053087 A1* | 2/2013 | Li | H04W 76/002 455/518 |
| 2013/0142106 A1* | 6/2013 | Zhang | H04W 72/042 370/315 |
| 2013/0215755 A1 | 8/2013 | Liu et al. | |
| 2014/0016466 A1* | 1/2014 | Calvanese Strinati | H04W 28/14 370/235 |
| 2014/0025736 A1* | 1/2014 | Wang | H04L 45/46 709/204 |
| 2014/0071957 A1* | 3/2014 | Xu | H04W 52/0219 370/336 |
| 2014/0204835 A1* | 7/2014 | Speight | H04W 72/04 370/315 |
| 2014/0376426 A1* | 12/2014 | Boudreau | H04L 47/41 370/294 |
| 2015/0050954 A1 | 2/2015 | Kameno et al. | |
| 2015/0156638 A1* | 6/2015 | Yerramalli | H04W 16/14 455/454 |
| 2015/0163680 A1* | 6/2015 | Valliappan | H04W 16/14 370/329 |
| 2015/0264668 A1 | 9/2015 | Takehana et al. | |
| 2015/0296404 A1* | 10/2015 | Sharma | H04W 28/0215 370/230 |

FOREIGN PATENT DOCUMENTS

| | | |
|---|---|---|
| WO | 2011109424 A1 | 9/2011 |
| WO | 2012109531 A2 | 8/2012 |
| WO | 2012113136 A1 | 8/2012 |
| WO | 2012172513 A1 | 12/2012 |
| WO | 2013157577 A1 | 10/2013 |

OTHER PUBLICATIONS

PCT International Search Report, PCT/CN2015/097178, dated Mar. 11, 2016, 11 Pages.

* cited by examiner

SYSTEM AND METHOD FOR MACHINE TYPE COMMUNICATION

FIELD OF THE DISCLOSURE

The present disclosure relates to mobile communications and in particular relates to machine type communication (MTC).

BACKGROUND

Wireless data usage has experienced, and continues to experience, significant growth. Some estimates provide for growth in data usage exceeding one thousand times current usage in the near future. Contributing factors to this growth include higher data usage on mobile devices such as smartphones or tablets, as well as the use of data in other emerging areas such as machine-to-machine (M2M), device-to-device (D2D), or other traffic types.

In particular the explosive growth of MTC will pose unique challenges with regard to access and signaling requirements for network operators. Further these devices are usually energy constrained and designed for low energy consumption thus channel requests for example, which usually use high output power for access bursts also pose a challenge. Further, data transfer from M2M devices is typically bursty with low-rate traffic, resulting in inefficient spectrum usage.

SUMMARY

An embodiment of the present disclosure provides a method at a network element for providing data access to a network. The method includes establishing a primary communication channel with the network with a first wireless interface of said network element, establishing a complementary communication channel with one or more of a group of delay tolerant devices with a second wireless interface of the network element, receiving data from respective delay tolerant devices in the group, aggregating the received data and transferring the aggregated data on the established primary communication channel to the network.

Another embodiment of the present disclosure provides a network element for providing data access to a network. The network element includes a processor configured to operate a first wireless interface of the network element to establish a primary communication channel with the network with a first wireless interface of said network element, establish a complementary communication channel with one or more of a group of delay tolerant devices with a second wireless interface of said network element, receive data from respective delay tolerant devices in the group, aggregate the received data and transfer the aggregated data on the established primary communication channel to the network.

Aspects of the above embodiments provide for the primary and complementary channels to correspond respectively to first and second frequency spectrums, which may be in turn be respectively licensed and unlicensed spectrums.

BRIEF DESCRIPTION OF THE DRAWINGS

The present disclosure will be better understood with reference to the drawings, in which.

DETAILED DESCRIPTION OF THE DRAWINGS

Figure 1A:
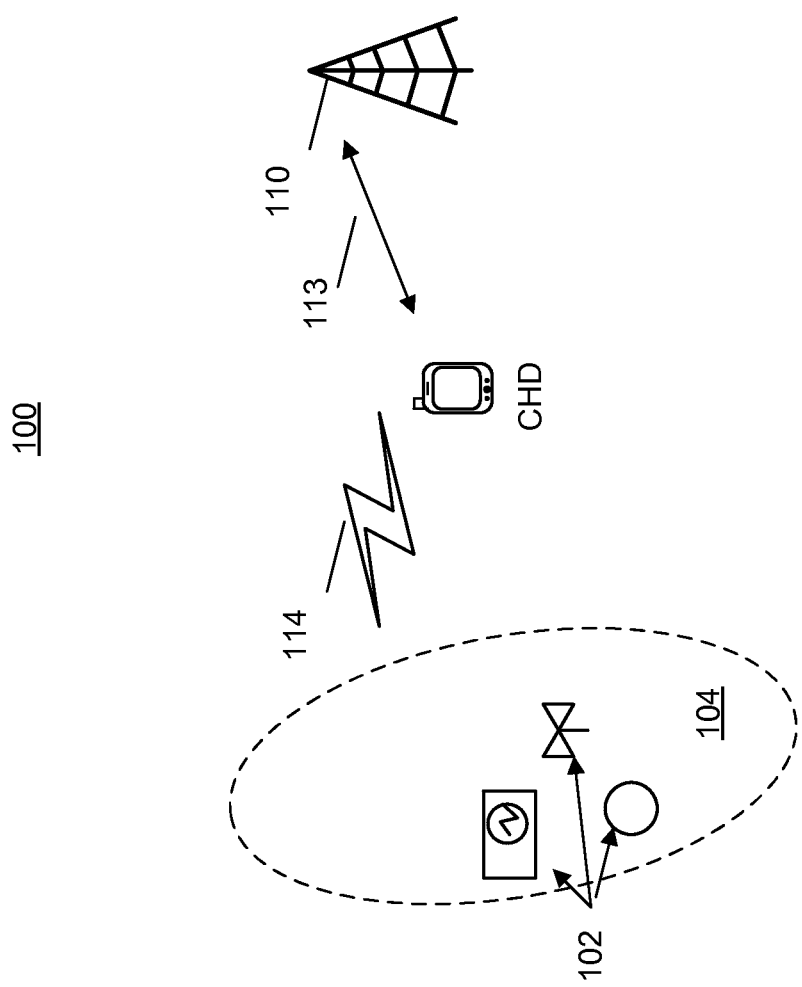
FIG. 1a is a block diagram showing network architecture according to an embodiment of the present disclosure.

Embodiments of the present disclosure provide for methods and systems to exploit a given wireless spectrum (such as an unlicensed spectrum) in order to ease a burden of excessive traffic on another wireless spectrum (such as a licensed spectrum). In one aspect of the present disclosure, the use of the unlicensed (also termed complementary) spectrum in conjunction with multi-hop radio access enables support for massive connectivity of delay tolerant devices without congesting the licensed (also termed primary) spectrum or sacrificing Quality of Service (QoS) for existing users of the primary spectrum.

As used herein, "licensed spectrum" refers to a portion of radio frequency spectrum exclusively granted to a licensee within a geographic area. For example, various regulatory bodies such as the Federal Communications Commission (FCC) and the National Telecommunications & information Administration (NTIA) in the United States may provide a frequency allocation to a licensee for a portion of the radio frequency spectrum in a given band. Such license typically defines frequency ranges, geographic locations, and maximum power levels, among other provisions.

"Unlicensed spectrum", as used herein, refers to a frequency band that has been allocated by regulatory agencies, to be available to unregistered users. That is, the unlicensed spectrum is a portion of the radio frequency spectrum without an exclusive licensee. Regulations may limit transmission power over such unlicensed spectrum.

Currently, significant data is provided through licensed spectrum. For example, data may be provided over cellular networks, such as those described by the Third Generation Partnership Project (3GPP) standards. Such mobile technologies include, but are not limited to, Second Generation networks such as the Global System for Mobile Communications (GSM) and Code Division Multiple Access (CDMA), Third Generation networks such as the Universal Mobile Telecommunications System (UMTS), and Fourth Generation networks such as Long Term Evolution (LTE). Also, Fifth Generation (5G) networks are starting to be developed. Utilizing the technologies in these standards, network operators provide user equipment (UE) with service over predefined licensed frequencies.

Wireless data is also provided over unlicensed spectra as for example, described in The Institute of Electrical and Electronic Engineers (IEEE) 802.11 standards for wireless local area networks (WLAN).

However, licensed spectrum is heavily utilized in many situations and in order to accommodate a significant data increase, various options including the use of unlicensed spectrum for 5G communications may be explored.

An aspect of the of the present disclosure, for example with M2M traffic, provides for designating a cluster head device (CHD) in a role of an intermediate node in communication between a cluster of machine type devices (MTD) and the network (NW) to thereby provide a two-hop radio access. The CHD may be a dual mode, multi-spectrum device operable on the unlicensed spectrum to aggregate data from MTDs and forward the aggregated data to the NW on the licensed spectrum. The CHD may be designated by the NW, predetermined or discovered by the network. In one embodiment, the CHD may be a user equipment (UE).

In another aspect of the system and method of the present disclosure, the MTDs are hierarchically clustered into signaling and access groups that communicate with the NW through the CHD. In one embodiment, the MTDs may be preconfigured with a group identification associating them with an access cluster. The group identification may be used in reporting their data (as discussed below). Further, individual MTDs in an access cluster may be preconfigured with an index to aid the CHD in allocating a resource to a particular MTD.

The system and methods of the present disclosure allow M2M devices to take advantage of mobile networks and future proposed networks based on fifth generation (5G) networks. However, the present disclosure is not limited to 5G networks, and the methods and systems described herein may be equally used with other network technologies. The use of 5G networks in the examples below is merely done for illustration.

Proposed 5G networks may support a huge number of M2M devices with bursty low-data rate and delay tolerant traffic. Examples of such device traffic may include metering traffic in smart grids, sensor reporting vending machine traffic, to name a few. Further, the systems and methods of the present disclosure make it feasible for M2M traffic to benefit from global coverage and existing mobile infrastructure to achieve ubiquitous connectivity.

In still a further aspect, delay tolerant MTC traffic may be handled opportunistically using unlicensed spectrum resources. In other words, the network may be able to better time when MTC traffic is communicated on the network.

Reference is now made to FIG. 1a, which shows a block diagram of an example wireless network architecture 100 according to an embodiment of the present disclosure. The architecture 100 includes a network element designated as a CHD, a base station 110 and a cluster 104 of delay tolerant devices 102 (such as for example MTDs). The base station 110 may belong to a particular network operator and provides network access to the CHD on a licensed spectrum 113. While the base station is described in terms of an eNB, the base station may be any access point, transmission point, or device, referred to generally as any network element which provides access to the network. The CHD may be any UE type device that is a dual-mode device having a first wireless interface operable for establishing a primary communication channel 113 with the network, and a second wireless interface for establishing a complementary communication channel 114 with a one or more of the group 104 of delay tolerant devices 102. Further, the CHD may have a software-configurable air interface. In the illustrated embodiment the primary channel may be in the licensed spectrum and the secondary channel in the unlicensed spectrum. The CHD may be configured to receiving data from respective delay tolerant devices 102 in the cluster 104, aggregate the received data and transfer the aggregated data on the established primary communication channel 113 to the network. The operation of the architecture 100 is described in more detail below.

Figure 1B:
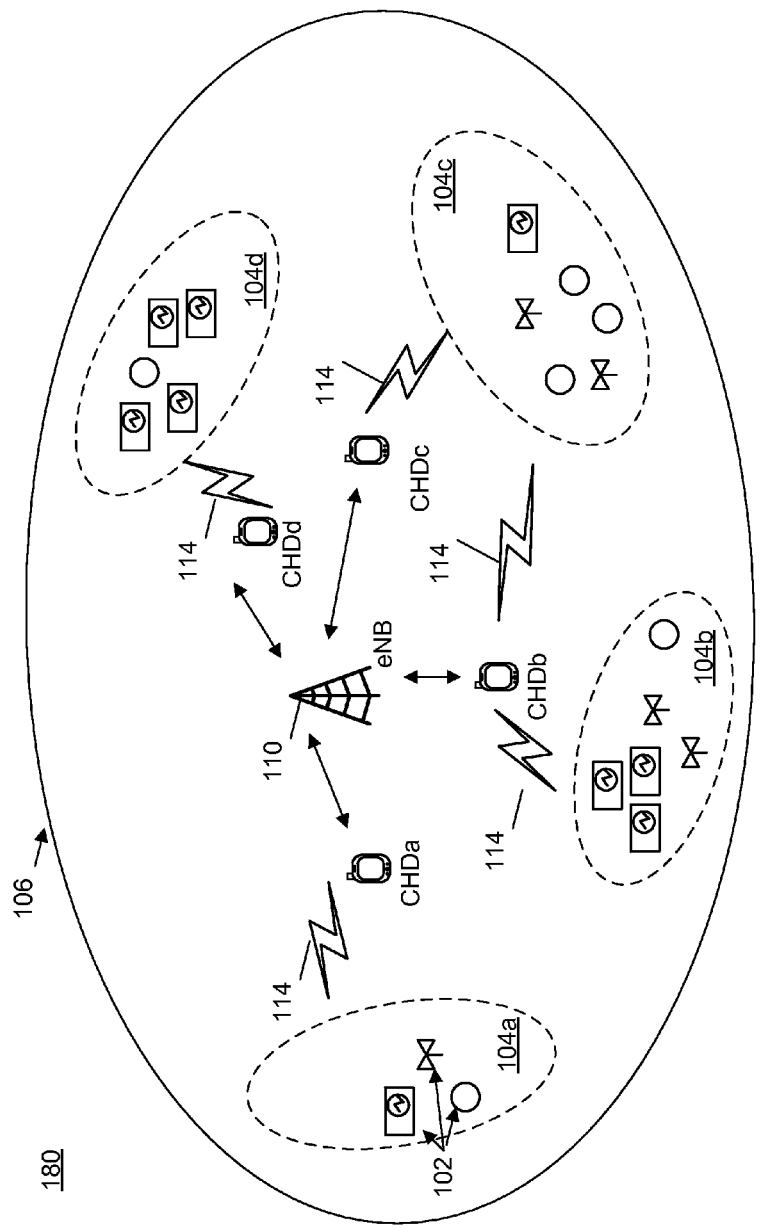
FIG. 1b is a block diagram showing a hierarchical arrangement of the network architecture of FIG. 1a, according to an embodiment of the present disclosure.

Reference is now made to FIG. 1b, which shows a block diagram 180 of an example hierarchical arrangement of the network architecture 100 according to an aspect of the present disclosure. As seen in FIG. 1b, various delay tolerant devices, MTDs 102 are organized in groups, termed herein as "access clusters" 104a-d.

Each access cluster may be formed based on various criteria. For example, access clusters may be formed by devices sharing a similar physical proximity (e.g. home, warehouse, smart meters, sensors etc). However, in other embodiments clusters may also be formed based on other factors, such as ownership of the various MTDs, communications systems within the MTDs, among other factors.

The four illustrated access clusters 104a-d, may be organized into a further group termed a signaling cluster 106. A signaling cluster 106 may comprise many access clusters in order to increase signaling efficiency. This clustering into signaling and access groups facilitates hierarchical signaling.

As illustrated in FIG. 1b, each access cluster 104a-d uses the unlicensed spectrum to communicate with its dual-mode cluster head device (CHD) CHDa-d, respectively. In some of the embodiments described herein, the CHD is a dual-mode 5G device which is operable over both the primary licensed spectrum to communicate with a network (for example via evolved node Bs (eNBs) 110) and to communicate 114 with the MTDs 102 of its access cluster 104 over the complementary unlicensed spectrum. The CHD may be designated by the network to operate with a large number of MTC devices. The CHD may have a software-configurable air interface. In other embodiments, rather than communicate with an eNB, the CHD may communicate with other access points, transmission points, or devices, referred to generally as any network element.

The architectures 100 and 180, as exemplified in FIGS. 1a and 1b respectively, provide a reliable link (due to use of the licensed spectrum) to the existing mobile network infrastructure to ensure random access and control signaling for literally hundreds of the MTC devices attached to it without the excessive overhead incurred if each MTC device attempted to connect directly to the mobile network. If each MTC device attempted to connect to the network, the signaling overhead of the large numbers of MTCs with small data-rate traffic may be overwhelming to the network and the cost for using the licensed spectrum may be exorbitantly high.

Figure 2A:
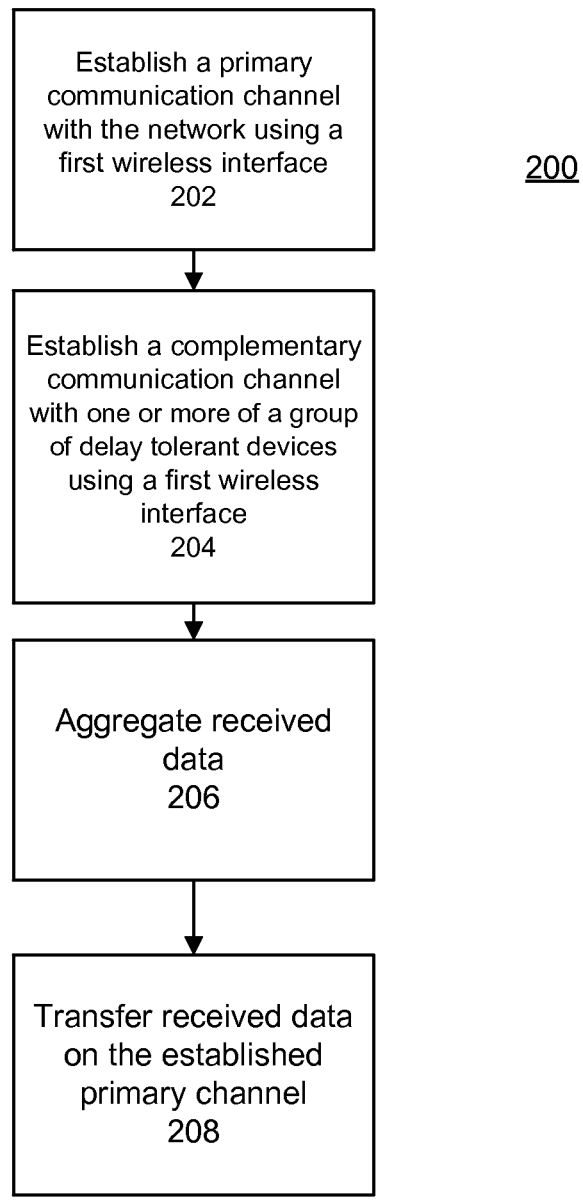
FIG. 2a is a flow diagram of a method for providing data access to a network, in accordance with an embodiment of the present disclosure.

Referring to FIG. 2a there is shown a flow diagram 200 of a method for providing data access to a network, in accordance with an aspect of the present disclosure. At block 202, the network element establishes a primary communication channel with the network using a first wireless interface and at block 204 establishes a complementary communication channel with one or more of a group of delay tolerant devices using a second wireless interface. At block 206, data received form respective delay tolerant devices in the group are aggregated and at block 208, the received data is transferred on the established primary communication channel to the network.

Figure 2B:
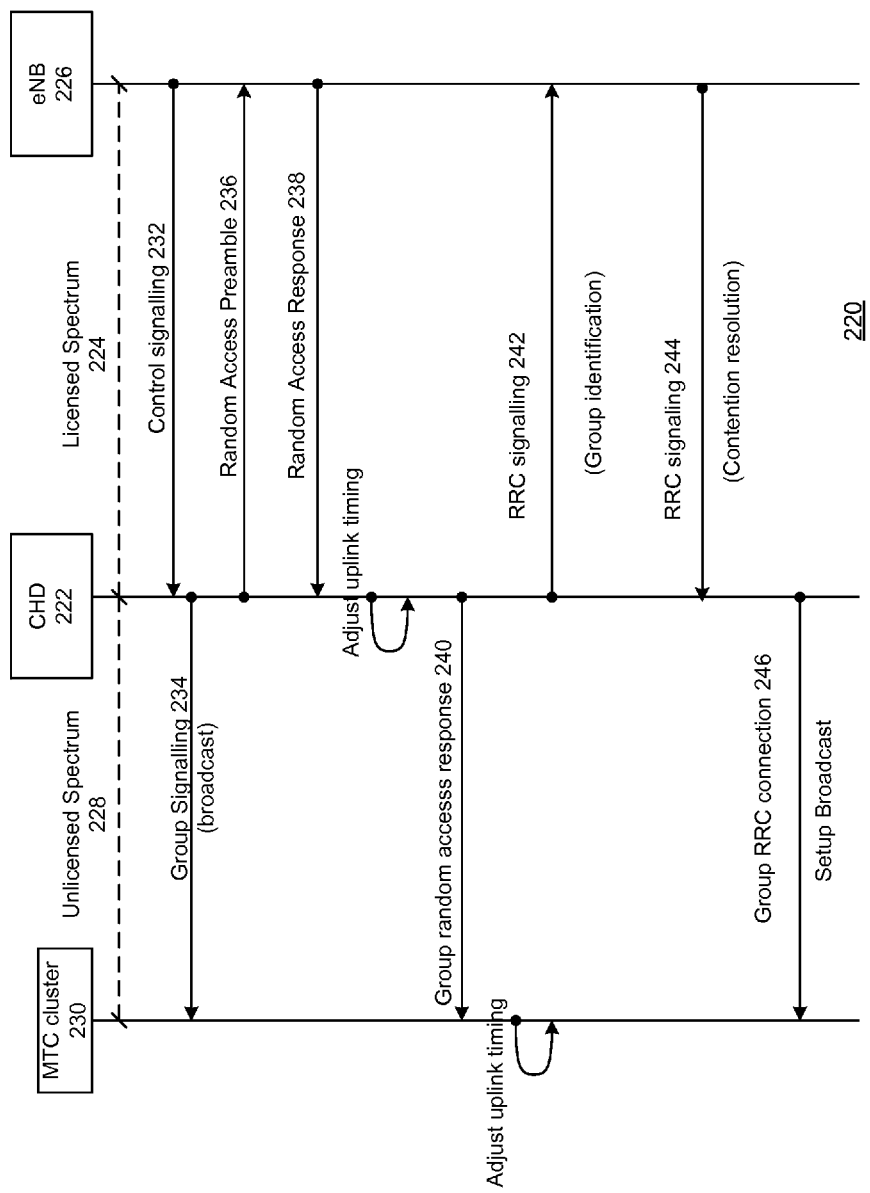
FIG. 2b is a dataflow diagram showing signaling between MTC clusters and a network in accordance with an embodiment of the present disclosure.

Referring now to FIG. 2b there is shown an example of a signaling diagram 220 for a data access procedure in accordance with an aspect of the present disclosure. In accordance with the embodiment of FIG. 2b, a pull-based random access is shown for a MTC cluster based random access. However, in other embodiments, push-based random access may be used.

As described above, the CHD may be a dual-mode CHD 222 capable of operating over the primary licensed spectrum 224 to communicate with an eNB 226. CHD 222 is further operable over the complementary unlicensed spectrum 228 to communicate with an MTC cluster 230. Criteria for selecting the cluster-head device may be based on location, channel conditions, multi-spectrum capability, etc.

In a pull-based embodiment, the network triggers the random access by sending a control signal 232 to the cluster head device 222. This may be triggered periodically, for example based on knowing when the MTC devices need to send data. For example, if the MTC devices need to report once a day, the network may have a timer to trigger control signal 232 on a daily basis. Other examples are possible. Control signal 232 is meant to start a random access procedure for the entire "cluster", via the cluster head device 222.

The CHD 222 then uses group signaling message 234 to identify itself as the designated CHD to the MTC devices within the MTC cluster 230.

The CHD 222 then starts a contention based random access procedure, by sending a RACH (random access channel) preamble 236 to the eNB. As indicated above, preamble 236 is a random access preamble for the MTC cluster, via the CHD 222.

The eNB then sends a response message "Random Access Response" 238 to the CHD 222 on the DL-SCH (Downlink shared channel), which includes a timing advance value. The timing advance value is used to inform the CHD 222 on adjusting its uplink timing so it can compensate for the round trip delay caused by CHD distance from the eNB.

The CHD 222 adjusts its uplink timing and broadcasts a group random access response 240 to the MTC cluster 230 along with the timing advance value so that the MTC devices within the MTC cluster 230 may adjust their uplink timing.

Using the UL-SCH (uplink shared channel), the CHD sends a "RRC connection request message" 242 to the eNB 226 along with a group identification of the MTC cluster to establish an RRC (radio resource control) layer connection between the CHD 222 and the eNB 226.

The eNB 226 responds with a contention resolution message 244 to the CHD which contains the new C-RNTI (cell radio network temporary identity) which is used for further communication.

The CHD 222 in turn establishes a group RRC connection 246 (setup broadcast) with the MTC devices within the MTC clusters 230.

In accordance with the embodiments described herein, it is assumed that all MTC devices within the MTC cluster 230 are able to synchronize their downlink timing through either cell search or cluster head device discovery procedures. Further, since the MTC devices within the MTC cluster 230 are co-located, they have similar timing advance which can be estimated through the preamble sent by the CHD 222.

Uplink synchronization to the eNB is therefore acquired by the CHD 222 on behalf of the MTC devices in the cluster during the random access response step and forwarded (broadcast) to the MTC devices within the MTC cluster 230.

Thus cluster-based random access saves RACH resources (reducing the RACH overload problem) since a separate preamble from every device in the cluster is no longer required. The elimination of the need for a separate preamble from every device also saves power consumption of cluster devices.

While, the pull-based, i.e. network triggered, cluster-based random access, described above with reference to FIG. 2b, reduces the RACH overload problem, in some cases push-based approaches to cluster based access may lead to a high variance of RACH intensity. In push-based access, each MTC cluster may individually make the decision on whether to report, and this may make it difficult for the network to estimate the number of MTC devices competing for RACH resources at the same time and allocate the data resources accordingly. However, data aggregation is still possible but it may be less efficient and may lead to some delay since the CHD would wait to receive data from the whole access cluster before aggregating and forwarding it to the network opportunistically. Further the CHD would need adequate storage capacity for the aggregated data.

Figure 3:
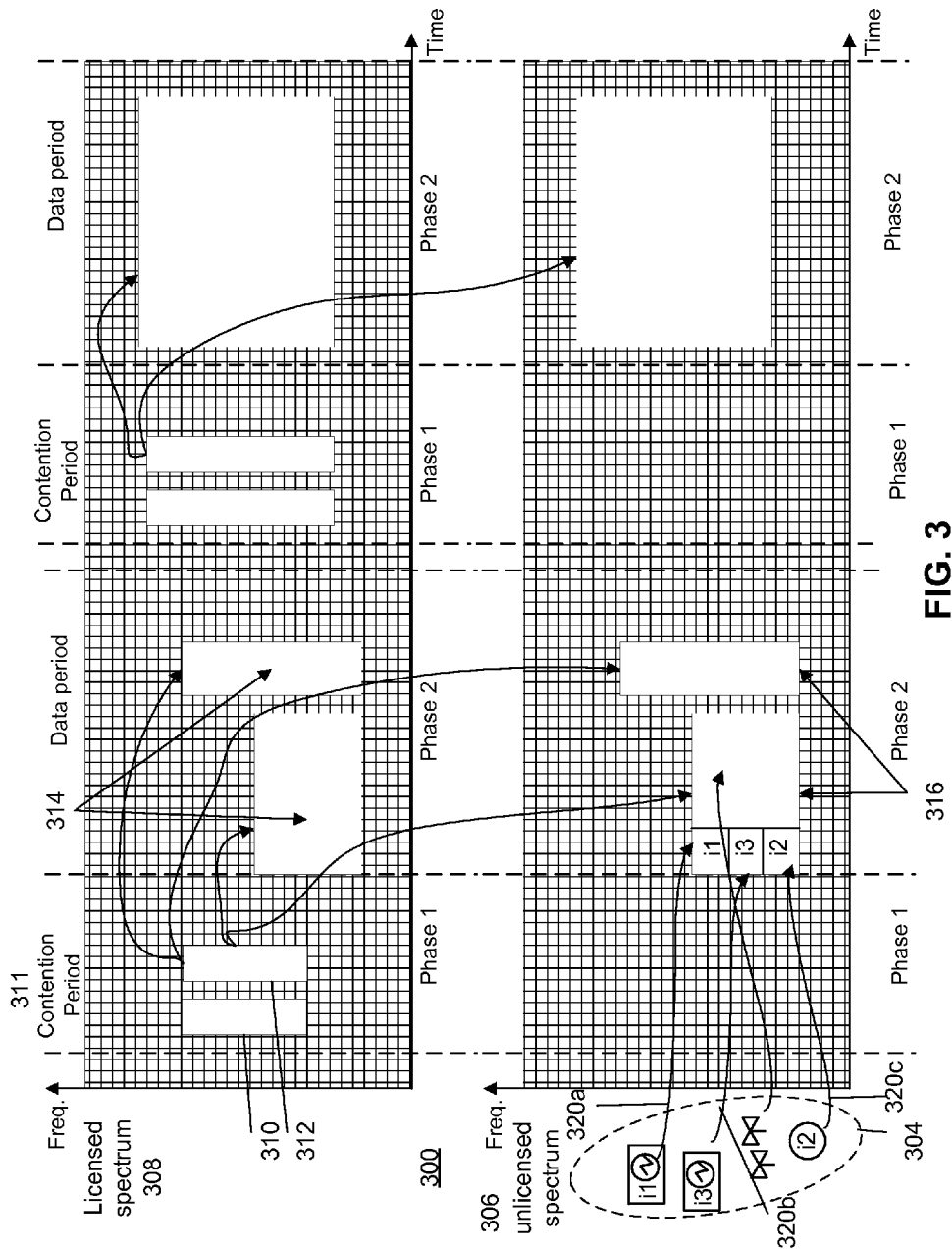
FIG. 3 is a resource grid showing resource allocation according one embodiment of the present disclosure.

From FIG. 2b above, after the signaling process has completed, the cluster is connected to the eNB and may report data. Reference is now made to FIG. 3, which shows a resource grid representation 300 for MTC cluster data allocation in accordance with one aspect of the present disclosure. FIG. 3 utilizes a familiar resource grid representation to illustrate an example of how the CHD aggregates the received data from the MTC cluster 304 on the unlicensed spectrum 306 before forwarding the aggregated data to the eNB using the licensed spectrum 308.

In accordance with an embodiment of the invention, the radio resource element grid supports multiple radio communication channels that are allocated to certain radio resource elements (locations) in the radio resource element grid. For ease of description, each radio communication channel corresponds to or is allocated a subset of the time-frequency resource element grid. The resource grid shows a repeating sequence of a contention period followed by a data period on the licensed spectrum. This pattern repeats for successive new cluster data transmissions. In the illustrated embodiment 300 it may be assumed that because the MTC devices transmit small amounts of data, each MTC device may be assigned a fixed amount of resource blocks (RBs) for a particular application. For example, in one application (such as smart meter reporting) only 1 RB may be needed per MTC device. However, in other embodiments more resource blocks may be needed, and the present disclosure is not limited to any particular number of resource blocks per MTC device. In still further embodiments the allocation may also account for variable number of RBs per MTC device.

As shown in FIG. 3, the CHD during a first phase contention period 311 contends for resources, indicated as contention resources 310, and secures uplink resources 312 on the licensed spectrum 308 to the eNB. In turn in a second phase 2, the CHD signals the MTC devices using PDCCH (physical downlink control channel) control signaling to allocate uplink resources from the MTC devices on its downlink. As will be appreciated, the CHD only needs to allocate uplink resources for the MTC devices at the cluster level, i.e. the aggregated data. The MTC devices do not need to engage in contention for uplink resources. For example as shown in FIG. 3, a block of N RBs 314 per CHD can be allocated on the licensed spectrum to convey the aggregated data traffic of a given MTC cluster 304 of size N to the eNB. A block of N RBs 316 per MTC cluster can be allocated on the unlicensed spectrum so that that the MTC devices in the cluster report their data to the CHD.

Further, MTC devices in the cluster 304 may transmit their data according to a pre-specified indexing order to decrease signaling overhead. In other words each MTC device may be indexed in the cluster to have its data allocated to a specific resource element in the resource grid for transmission to the network. This is illustrated graphically in FIG. 3, by arrows 320a-c. For example three MTCs are shown having respective indices i1, i2 and i3. The corresponding resource blocks i1, i2 and i3 are shown allocated in the aggregated data resource blocks 316. The indexing is used by the CHD and the MTC devices to link or allocate specific radio resource to the transmission of the cluster data to the network.

Signaling overhead may further be decreased by linking the preamble resources (e.g. Zadoff-Chu (ZC) sequence) to the actual data resources used by the CHD on the licensed spectrum 308 to convey the aggregated data to the eNB and by the MTC devices on the unlicensed spectrum to report their data to the CHD.

A benefit of cluster-based control signaling allows spectrum reuse of the unlicensed spectrum because MTC devices use low power to report their data to the CHD.

The indexing described above may be configured through announcements by the eNB. Further, the indexing, the usage of the indexing by cluster-head devices and MTC devices, may be preconfigured or also announced by the network.

Thus it may be seen that the random access procedure for a given cluster may be pull-based, i.e. triggered by the network sending of a group signaling message containing the group ID of the access cluster; group rather than individual signaling in this case allows for saving of signaling resources; or push-based, e.g. through access class barring (ACB), separate RACH resources, dynamic allocation of RACH resources, smart meter device specific back off, slotted access etc.

In another aspect of the disclosure, the network can trigger the reports for a signaling cluster, where the signaling cluster comprises many access clusters as described above.

In another aspect of the disclosure, the signaling of the resource allocation to the MTC cluster devices can be done directly by the network. In this aspect, the CHD continues to act as the aggregating device and may be informed of the resource allocation.

Figure 4:
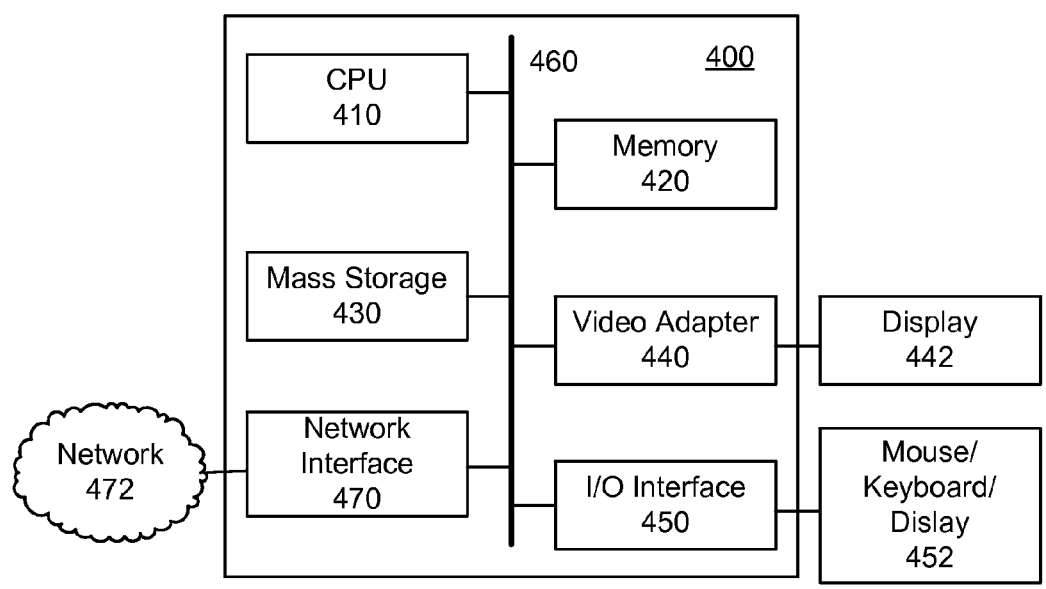
FIG. 4 is a block diagram illustrating a computing platform in accordance with an embodiment of the present disclosure.

The functionality described herein may be implemented on any one or combination of network elements. FIG. 4 is a block diagram of a processing system 400 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 400 may comprise a processing unit equipped with one or more input/output devices, such as a speaker, microphone, mouse, touchscreen, keypad, keyboard, printer, display, and the like. The processing unit may include a central processing unit (CPU) 410, memory 420, a mass storage device 430, a video adapter 440, and an I/O interface 450 connected to a bus 460.

The bus 460 may be one or more of any type of several bus architectures including a memory bus or memory controller, a peripheral bus, video bus, or the like. The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 430 may comprise any type of storage device configured to store data, programs, and other information and to make the data, programs, and other information accessible via the bus. The mass storage device 430 may comprise, for example, one or more of a solid state drive, hard disk drive, a magnetic disk drive, an optical disk drive, or the like.

The video adapter 440 and the I/O interface 450 provide interfaces to couple external input and output devices to the processing unit. As illustrated, examples of input and output devices include the display 442 coupled to the video adapter and the mouse/keyboard/printer 452 coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit 400 also includes one or more network interfaces 470, which may comprise wired links, such as an Ethernet cable or the like, and/or wireless links to access nodes or different networks. The network interface 470 allows the processing unit to communicate with remote units via the networks. For example, the network interface 470 may provide wireless communication via one or more transmitters/transmit antennas and one or more receivers/receive antennas. In an embodiment, the processing unit 400 is coupled to a local-area network or a wide-area network, shown as network 472, for data processing and communications with remote devices, such as other processing units, the Internet, remote storage facilities, or the like.

Figure 5:
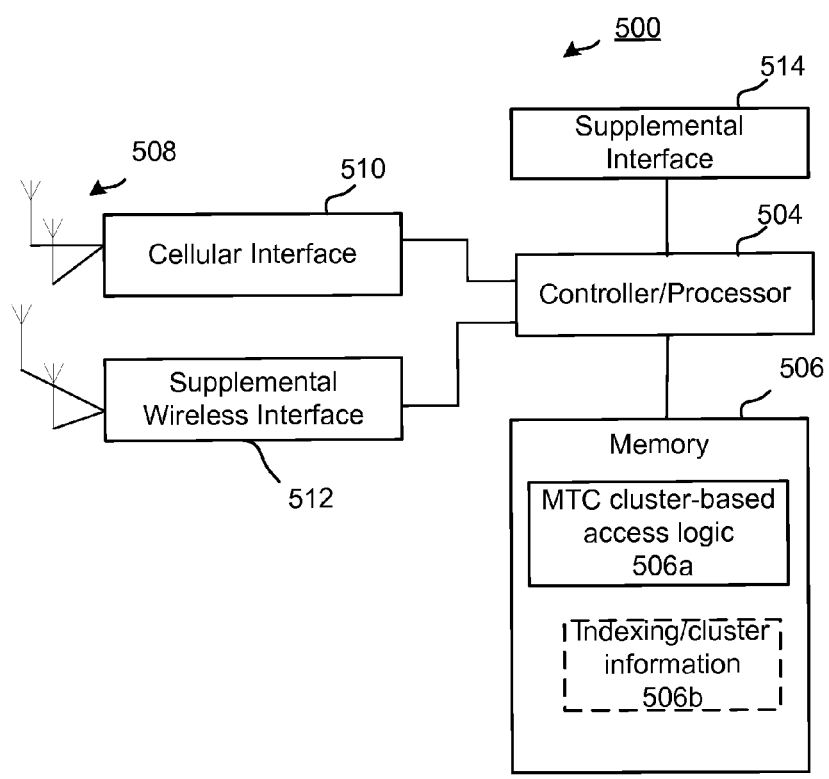
FIG. 5 illustrates a block diagram of an embodiment communications device.

FIG. 5 illustrates a block diagram of an embodiment of a communications device 500, which may be equivalent to one or more devices (e.g., UEs, NBs, MTD's etc.) discussed above. The communications device 500 may include a processor 504, a memory 506, a cellular interface 510, a supplemental wireless interface 512, and a supplemental interface 514, which may (or may not) be arranged as shown in FIG. 5. The processor 504 may be any component capable of performing computations and/or other processing related tasks, and the memory 506 may be any component capable of storing programming and/or instructions for the processor 504. The cellular interface 510 may be any component or collection of components that allows the communications device 500 to communicate using a cellular signal, and may be used to receive and/or transmit information over a cellular connection of a cellular network on either a licensed and or unlicensed spectrum. The supplemental wireless interface 512 may be any component or collection of components that allows the communications device 500 to communicate via a non-cellular wireless protocol, such as a Wi-Fi or Bluetooth protocol, or a control protocol. The device 500 may use the cellular interface 510 and/or the supplemental wireless interface 512 to communicate with any wirelessly enabled component, e.g., a base station, relay, mobile device, machine type device etc. The supplemental interface 514 may be any component or collection of components that allows the communications device 500 to communicate via a supplemental protocol, including wireline protocols. In embodiments, the supplemental interface 514 may allow the device 500 to communicate with another component, such as a backhaul network component.

The device 500 may be configured according to any aspect of the present disclosure. For example the controller/ processor 504 may control the various components and executes any software or firmware in memory 506 that is used to operate the functionality and features of device 500. For example the device 500 may have a software-configurable air interface featuring dual-mode (licensed-unlicensed) multi-spectrum relaying and data-aggregation capabilities. Further, the device 500 may receive information from a serving base station with regard to a MTC cluster-based data access. Such signals may be received by device 500 over antennas 508, served by cellular interface 510 or supplemental wireless interface 512. Under control of controller/processor 504, the signals are decoded to receive the information for the communication.

The device 500 may also include MTC cluster-based access logic 506a for aggregating data on the unlicensed spectrum from MTDs and forward the aggregated data to the NW on the licensed spectrum. Accordingly, the device 500 under control of controller/processor 504 may execute MTC cluster-based access logic 506a stored in memory 506, in order to participate in the role of intermediate node in communications between a cluster of machine type devices (MTD) and the NW. The logic 506a may implement the signaling and resource allocation as for example described with reference to FIGS. 2 and 3 respectively.

The device 500 may in another aspect be configured as a MTD and include in memory 506, information 506b for participating in cluster based access. Such information may include group (cluster) identification, indexing, information on geographically co-located MTC devices and such like.

As described above, the use of the unlicensed spectrum is particularly relevant to MTC devices. Specifically, MTC devices are typically characterized by small packet size (each MTC device typically sends or receives a small amount of data), mostly delay tolerant thereby allowing for opportunistic usage of unlicensed spectrum, and mostly energy constrained. These characteristics make MTC a suitable application scenario for using unlicensed spectrum due to the unreliable but rich nature of such spectrum, i.e. even when subject to high interference levels, the unlicensed spectrum will suffice for such applications.

Further, M2M communication may also benefit from unlicensed spectrum usage with lower frequency and longer-range characteristics in order to facilitate long-distance data transfers and meter reports while consuming less energy.

For large file transfers (such as surveillance video), opportunistic usage of non-congested unlicensed spectrum may be implemented. For example if data is not needed instantly, then M2M applications can wait for available unlicensed spectrum chunks to opportunistically deliver low data rate delay tolerant M2M traffic from groups of geographically co-located MTC devices. These application scenarios include collecting measurement data from MTC devices in smart grid networks or navigation signals from positioning sensors in navigation networks.

While embodiments of this disclosure have been described with reference to illustrative embodiments, this description is not intended to be construed in a limiting sense. Various modifications and combinations of the illustrative embodiments, as well as other embodiments of this disclosure, will be apparent to persons skilled in the art upon reference to the description. It is therefore intended that the appended claims encompass any such modifications or embodiments.

The invention claimed is:

1. A method for a cluster head device for providing data access to a network, said method comprising:

receiving from said network a control signal to initiate a random access procedure for a group of delay tolerant devices;

based on the control signal, sending a group signaling message to the group of delay tolerant devices, the group signaling message including a group identifier that associates the cluster head device and the group of delay tolerant devices;

initiating a random access procedure with said network to establish a primary communication channel with the network for the group using the group identifier, wherein said primary communication channel uses a first spectrum;

establishing a complementary communication channel with the group of delay tolerant devices, wherein said complementary communication channel uses a second spectrum;

receiving data from respective delay tolerant devices in said group on said complementary communication channel;

aggregating said received data; and transferring said aggregated data on said established primary communication channel to said network.

2. The method of claim 1, wherein said first spectrum is a licensed spectrum and said second spectrum is an unlicensed spectrum.

3. The method of claim 1, further comprising receiving a signal indicating an allocation of resource blocks (RBs) on said second spectrum for said aggregated data.

4. The method of claim 1, further comprising transmitting a signal for an allocation of uplink data resources on said first spectrum, said allocation comprising an allocation for said aggregated data.

5. The method of claim 4, comprising conveying said aggregated data on said allocated uplink data resources.

6. The method of claim 4, further comprising linking a preamble resource to said allocated uplink data resource for conveying said aggregated data to said network.

7. The method of claim 1, further comprising allocating resource blocks (RBs) on said second spectrum for said data received from said respective delay tolerant devices.

8. The method of claim 7, further comprising linking a preamble resource to an allocated downlink resource on said second spectrum.

9. The method of claim 7, wherein said allocating of RBs includes indexing individual resource blocks with corresponding indices on respective delay tolerant devices.

10. The method of claim 1, further comprising receiving a signal from said network to trigger said data transfer.

11. The method of claim 1, wherein said wireless interfaces are software-configurable.

12. The method of claim 1, further comprising acquiring uplink synchronization information from said network in a random access channel procedure (RACH) during said establishing said primary communication channel with said network.

13. The method of claim 12, further comprising broadcasting said uplink synchronization information to said group of delay tolerant devices.

14. The method of claim 1, further comprising transmitting a preamble signal to said group for use by said delay tolerant devices in estimating a timing advance.

15. The method of claim 1, wherein said cluster head device is user equipment (UE).

16. The method of claim 1, wherein said cluster head device is a transmission point.

17. A cluster head device for providing data access to a network, said device comprising, a non-transitory memory configured to store instructions, and a processor configured to receive instructions from the non-transitory memory to cause the cluster head device to:
- receive from said network a control signal to initiate a random access procedure for a group of delay tolerant devices;
- based on the control signal, send a group signaling message to the group of delay tolerant devices, the group signaling message including a group identifier that associates the cluster head device and the group of delay tolerant devices;
- initiate a random access procedure with said network to establish with the network a primary communication channel for the group using the group identifier, wherein said primary communication channel uses a first spectrum;
- establish a complementary communication channel with the group of delay tolerant devices, wherein said complementary communication channel uses a second spectrum;
- receive data from respective delay tolerant devices in said group on said complementary communication channel;
- aggregate said received data; and
- transfer said aggregated data on said established primary communication channel to said network.

18. The device of claim 17, wherein said first spectrum is a licensed spectrum and said second spectrum is an unlicensed spectrum.

19. The device of claim 17, wherein the processor is further configured to transmit a signal for an allocation of uplink data resources on said first spectrum, said allocation comprising an allocation for said aggregated data.

20. The device of claim 19, wherein the processor is further configured to convey said aggregated data on said allocated uplink resources.

21. The device of claim 19, wherein the processor is further configured to link a preamble resource to said allocated uplink data resource for conveying said aggregated data to said network.

22. The device of claim 17, wherein the processor is further configured to allocate resource blocks (RBs) on said second spectrum for said data received from said respective delay tolerant devices.

23. The device of claim 22, wherein the processor is further configured to link a preamble resource to an allocated downlink resource on said second spectrum.

24. The device of claim 22, wherein the allocated RBs includes indexing of individual resource blocks with corresponding indices on respective delay tolerant devices.

25. The device of claim 17, wherein the processor is further configured to receive a signal indicating an allocation of resource blocks (RBs) on said second spectrum for said aggregated data.

26. The device of claim 17, wherein the processor is further configured to receive a signal from said network to trigger said data transfer.

27. The device of claim 17, wherein said wireless interfaces are software-configurable.

28. The device of claim 17, wherein the processor is further configured to acquire uplink synchronization information from said network in a random access channel procedure (RACH), during said establishing said primary communication channel with said network.

29. The device of claim 28, wherein the processor is further configure to broadcast said uplink synchronization information to said group of delay tolerant devices.

30. The device of claim 17, wherein the processor is further configured to transmit a preamble signal to said group for use by said delay tolerant devices in estimating a timing advance.

31. The device of claim 17, wherein said device is user equipment (UE).

32. The device of claim 17, wherein said device is a transmission point.

33. The device of claim 17, wherein said complementary communication channel is established with a respective one of a plurality of groups of delay tolerant devices.

34. The device of claim 33, wherein each said group of delay tolerant devices is identified by a group identification index.

35. The device of claim 17, wherein said group of delay tolerant devices is identified by a group identification index.

* * * * *